(12) United States Patent
Mazzarese et al.

(10) Patent No.: US 6,483,973 B1
(45) Date of Patent: Nov. 19, 2002

(54) CLADDING MEMBER FOR OPTICAL FIBERS AND OPTICAL FIBERS FORMED WITH THE CLADDING MEMBER

(75) Inventors: David J Mazzarese, Warren, MA (US); John D Prohaska, Millbury, MA (US); Malcolm Smith, Charlton, MA (US); Kanishka Tankala, Sturbridge, MA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/541,040

(22) Filed: Mar. 31, 2000

Related U.S. Application Data

(60) Provisional application No. 60/128,487, filed on Apr. 9, 1999.

(51) Int. Cl.$^7$ ................................................. G02B 6/22
(52) U.S. Cl. ...................... 385/123; 385/126; 385/146; 372/6
(58) Field of Search ................................. 385/123–128, 385/141, 142, 144, 146; 372/6, 26; 359/245

(56) References Cited

U.S. PATENT DOCUMENTS

| | | | | |
|---|---|---|---|---|
| 5,533,163 A | * | 7/1996 | Muendel | 385/126 |
| 5,949,941 A | * | 9/1999 | Digiovanni | 385/127 |
| 5,966,491 A | * | 10/1999 | Digiovanni | 385/127 |
| 6,157,763 A | * | 12/2000 | Grubb et al. | 385/126 |
| 6,249,638 B1 | * | 6/2001 | Hale | 385/145 |

* cited by examiner

*Primary Examiner*—Hemang Sanghavi
(74) *Attorney, Agent, or Firm*—Law Office of Leo Zucker

(57) ABSTRACT

The present invention provides an optical fiber for use in fiber lasers and amplifiers wherein the optical fiber has a core member surrounded by a cladding member for receiving pump energy and transferring the pump energy to the core member. The optical fiber also has an outer layer surrounding the cladding member. The cladding member has a circular exterior periphery and a predetermined refractive index ($n_c$). The cladding member has an index modified region that directs light to the core member. The index modified region has a stress field portion with a predetermined refractive index ($n_s$). The difference between the refractive index of the cladding member and that of the stress field portion ($n_c-n_s$) is within such a range that the stress field portion does not affect the polarization properties of the light traveling in the core member. Preferably, the difference between the refractive index of the cladding member and that of the stress field portion ($n_c-n_s$) is less than $10^{-4}$, and more preferably $10^{-5}$.

11 Claims, 5 Drawing Sheets

CLADDING MEMBER FOR OPTICAL FIBERS AND OPTICAL FIBERS FORMED WITH THE CLADDING MEMBER

CROSS-REFERENCE TO RELATED APPLICATION

This application claims priority under 35 U.S.C. § 119(e) of U.S. Provisional Application No. 60/128,487 filed Apr. 9, 1999, and entitled "Cladding Designs for Double Clad Fiber Lasers and Amplifiers".

FIELD OF THE INVENTION

The present invention relates to a cladding member and, more particularly, a cladding member for double-clad fiber lasers and amplifiers. In addition, the present invention relates to an optical fiber formed with such a cladding member.

BACKGROUND OF THE INVENTION

Fiber lasers and amplifiers can be made from optical fibers whose cores are doped with rare-earth materials. Optical fibers are pumped with light of a suitable wavelength to achieve laser action or signal amplification. The laser transition wavelength depends on a selection of rare-earth materials and host composition. Various rare-earth ions including Nd, Er, Yb, Ho, Tm, Pr, Eu, Ce, Dy, Sm, Tb, Gd and Pm have been used, which can provide laser action.

Based on the pumping technique, fiber lasers are classified into core-pumped fiber lasers and clad-pumped fiber lasers. In a core-pumped fiber laser, light from a pump source, such as a diode laser, is coupled directly into the fiber core which is doped with rare-earth materials. In a clad-pumped fiber laser, the single mode core doped with rare-earth materials is surrounded by an undoped multimode cladding. The pump light is launched into the cladding and guided in the cladding by a second cladding (glass or a polymer) with a lower refractive index. Cladding-pumped fiber lasers are therefore also referred to as double-clad fiber lasers. The main advantage of clad pumping over core pumping is that clad-pumped fibers are readily scalable to high output powers.

FIG. 1 shows a conventional double-clad fiber in which the core 2 and the first cladding 4 are both circular and are concentric with each other. Such a circular cladding 4 can support many modes which spiral around the core 2 without asserting any intensity on the core 2. Moreover, light launched into a circular cladding 4 will not be absorbed fully by the core 2. Thus, the circular-type double cladding 4 precludes efficient coupling of the pump light from the cladding to the core 2.

Other cladding members 4 are used to facilitate pump light rays to cross to the core 2 as they travel along the length of the fiber. FIG. 2(a) shows a double-clad fiber that has an off-centered core 2 as disclosed in U.S. Pat. No. 4,815,079. By off centering the core 2, skew mode light, which does not intersect the core 2 in a concentric geometry, can be made to intersect the core 2. However, an off-center-type cladding member 4 is still inefficient and impractical because a fraction of the skew mode light fails to intersect the core 2. Moreover, an off center type cladding member 4 is not amenable for use with standard fibers because it is difficult to align and line the off centered core 2 with the standard core. Any misalignment of the cores can lead to significant loss of power.

FIG. 2(b) shows another conventional double clad fiber in which a core 2 is centered in an elliptical cladding 4. This elliptical-type cladding 4 would be most efficient if the core 2 is positioned at one of the ellipse foci. However, such a cladding 4 is difficult to make, especially when the core 2 is to be positioned at an ellipse focus. Moreover, this elliptical type cladding 4 is not compatible with standard circular fibers, to which it has to be spliced.

FIG. 2(c) shows a polygon-type cladding 4 as disclosed in U.S. Pat. No. 5,533,163 wherein the polygons are categorized as "convex polygons" having the property that, if a plurality of such polygons are used to tile a plane surface, all of them will fit into the tiling with no spacing left between adjacent polygons. Further, all the polygons will be mirror images of one another about any common side. Accordingly, the above property limits the polygons to three (3), four (4) and six (6) sided polygons. These polygonal shapes significantly differ, in cross-section, from those of circular type fibers, which are commonly used to deliver pump power to double clad fibers. Therefore, polygon type cladding 4 results in a large mismatch area with a circular fiber causing inefficient coupling of pump light into double clad fibers.

FIG. 2(d) shows a double clad fiber with a D-shaped cladding 4 as disclosed in U.S. Pat. No. 5,864,645. Comparing to that of the polygon type cladding 4, a D-shaped cladding 4 has a smaller portion of cladding 4 that is removed. Therefore, a D-shape cladding 4 has a substantially circular shape that can effectively facilitate the double clad fiber to splice with a circular pump delivery fiber. However, as a general principle, a larger amount of cladding 4 is to be removed from the cladding 4 to improve the coupling efficiency. To solve the above dilemma, a much longer fiber is needed to couple the required pump light from the cladding 4 to the core 2 without losing the advantage of a substantially circular cladding 4. Such an extra coupling length is inefficient.

Therefore, it is desired to obtain a novel cladding member that facilitates both efficient coupling and effective splicing. Further, it is desired that such a novel cladding member as well as the optical fiber formed with the novel cladding member are easy to manufacture. The present invention provides a cladding member and an optical fiber that meet all the above requirements.

SUMMARY OF THE INVENTION

The present invention provides an optical fiber for use in fiber lasers and amplifiers wherein the optical fiber has a core member surrounded by a cladding member for receiving pump energy and transferring the pump energy to the core member. The optical fiber also has an outer layer surrounding the cladding member. The cladding member has a circular exterior periphery and a predetermined refractive index ($n_c$). The cladding member has an index modified region that directs light to the core member. The index modified region has a stress field portion with a predetermined refractive index ($n_s$). The difference between the refractive index of the cladding member and that of the stress field portion ($n_c - n_s$) is within such a range that the stress field portion does not affect the polarization properties of the light traveling in the core member. Preferably, the difference between the refractive index of the cladding member and that of the stress field portion ($n_c - n_s$) is less than $10^{-4}$, and more preferably $10^{-5}$.

In a preferred embodiment, the modified index region contains one or more dopants of any combination of elements Ge, Al, P, B and F. More preferably, the modified index region contains one of the following: (1) Ge and Al; (2) Ge and P; (3) Ge and B; (4) Ge and F; (5) P and Al; (6) Ge, P and Al; (7) Ge, P and B; (8) Ge, P and F; and (9) free air space.

The present invention also relates to a clad article used in optical fibers for receiving pump energy and transferring the pump energy to a core member. The clad article has a core member. A cladding member surrounds the core member and has a polygon shape of at least eight sides. Preferably, the clad article has a polygon shape of eleven sides or more. It is preferred that the clad article has a polygon shape of twelve sides or less.

The present invention further relates to a clad article used in optical fibers for receiving pump energy and transferring the pump energy to a core member. The clad article has a core member. A first cladding member surrounds the core member and has a substantially circular exterior periphery. The first cladding member has a cut-out portion extending from the exterior periphery and terminating with a curved boundary in the first cladding member. The clad article also has a second cladding member surrounding the first cladding member. The second cladding member has an interior periphery complementary to the exterior periphery of the first cladding member. In a preferred embodiment, the curved boundary of the cut-out portion is concave in relation to the circular exterior periphery. The first cladding member has three cut-out portions evenly distributed along its circular exterior periphery.

BRIEF DESCRIPTION OF THE DRAWINGS

These and other objects, features and elements of the present invention will be better understood from the following detailed description of preferred embodiments of the invention in which.

DETAILED DESCRIPTION OF THE INVENTION

Figure 1:
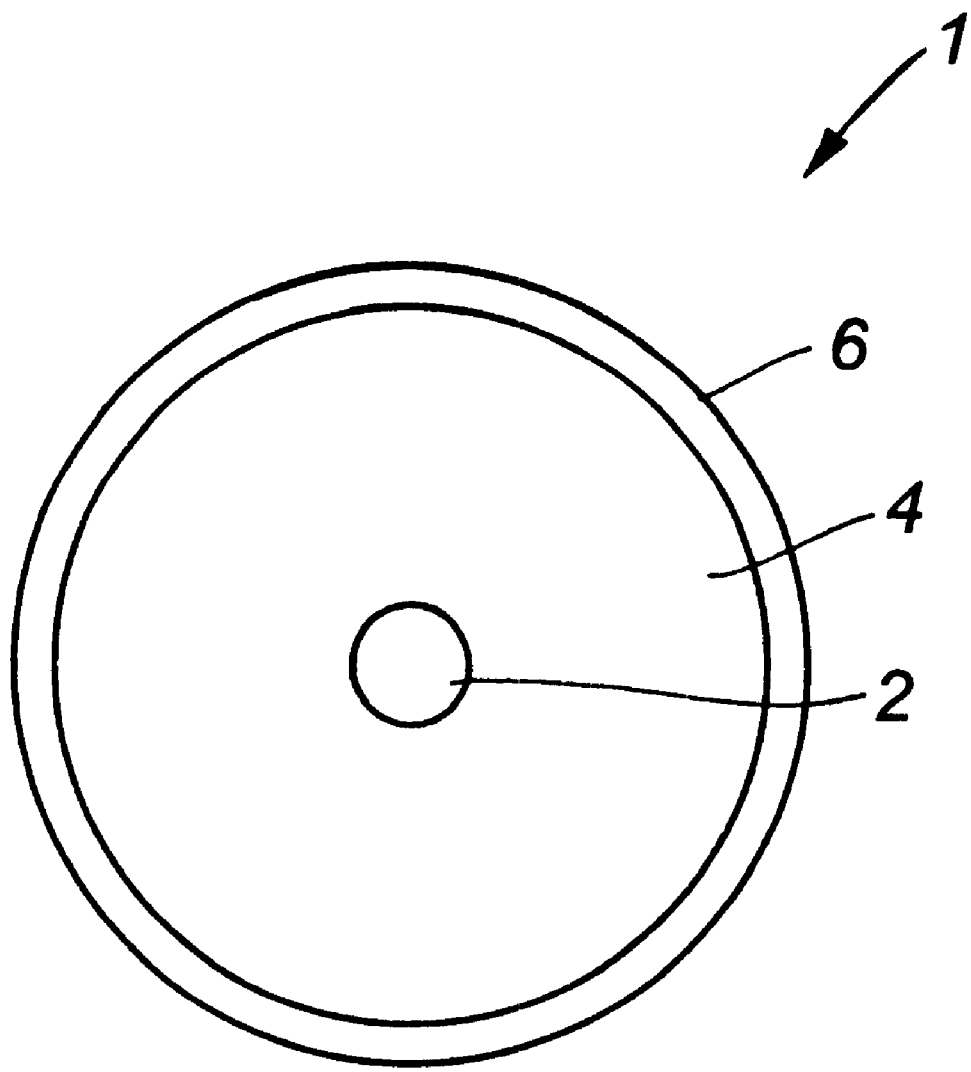
FIG. 1 shows a conventional double clad fiber having circular and concentric core and clads.
Figure 2A:
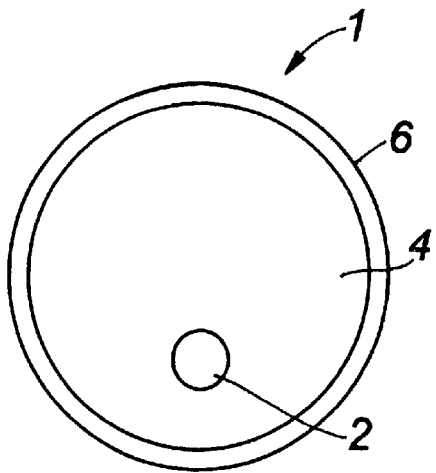
FIG. 2(a) shows a conventional double clad fiber with an off centered core structure.
Figure 2B:
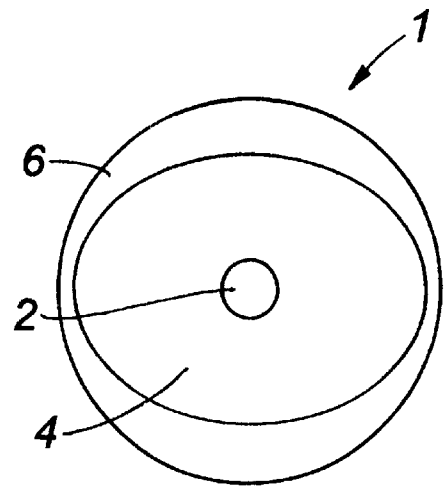
FIG. 2(b) shows a conventional double clad fiber with its core centered in an elliptical cladding member.
Figure 2C:
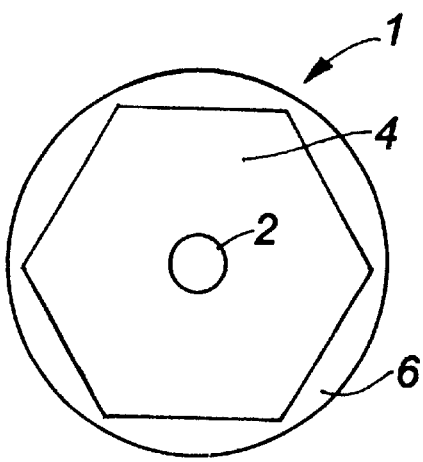
FIG. 2(c) shows a conventional polygon type fiber.
Figure 2D:
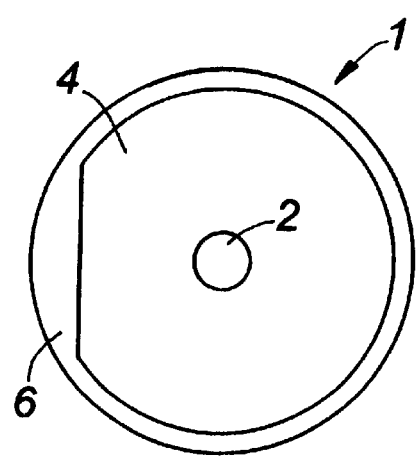
FIG. 2(d) shows a conventional double clad fiber with a D-shaped cladding member.

Various cladding members and optical fibers embodying the principles of the present invention are illustrated in FIGS. 1 to 5. The cladding member of the present invention allows efficient coupling of energy from the cladding member to the core member and effective splicing of fibers. In each embodiment, the same elements are designated with the same reference numerals and repetitive descriptions are omitted.

Figure 3A:
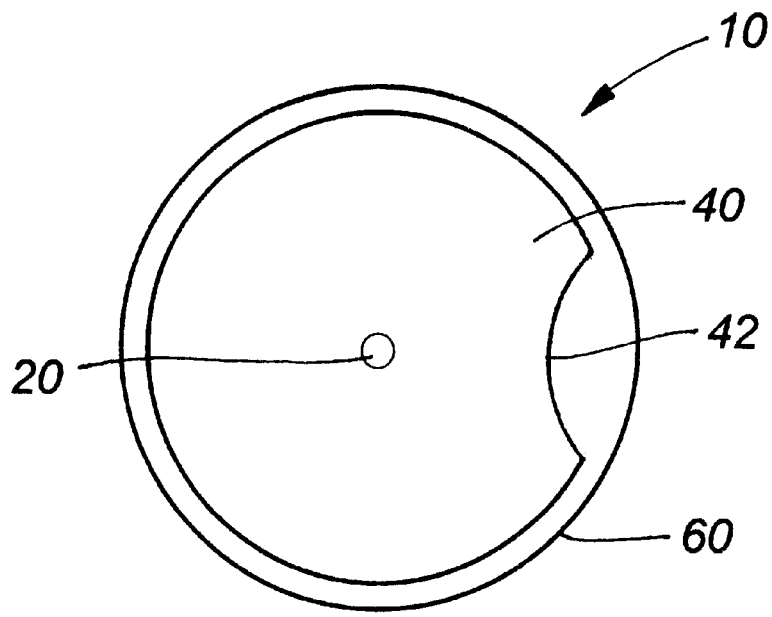
FIGS. 3(a) and 3(b) show double clad fibers with curved cut-off portions in cladding members according to the first embodiment of the present invention.
Figure 3B:
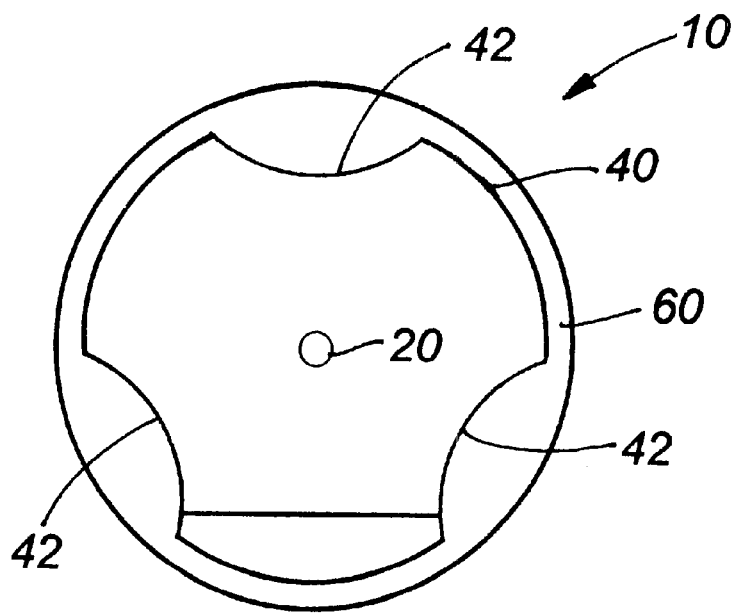

FIGS. 3(a) and 3(b) show a first embodiment of a double clad fiber 10 of the present invention. The double clad fiber 10 comprises a core member 20 at the center of the fiber 10. A first cladding member 40 surrounds the core member 20.

The first cladding member 40 has a substantially circular exterior periphery and has one or more cut-out portions 42 formed thereon. A second cladding member 60 surrounds the first cladding member 40. Pump light in the first cladding member 40 couples with the core member 20.

In a preferred embodiment, the first cladding member 40 preferably has substantially circular exterior periphery to benefit splicing. The cut-out portion 42 is located near the outside edge of the first cladding member 40. Preferably, the cut-out portion 42 extends from the exterior periphery of the cladding member 40 toward the core member 20. More preferably, the cladding member 40 retains a substantially circular exterior periphery after the cut-out portion 42 is formed. Thereby, the substantially circular cladding member 40 is beneficial for splicing.

In a further preferred embodiment, the cut-out portion 42 is a concave portion, as shown in FIG. 3(a). The concave portion 42 extends from the exterior periphery of the first cladding member 40 and terminates with a curved boundary in the first cladding member 40. More preferably, the second cladding member 60 has an interior periphery complementary to the exterior periphery of the first cladding member 40. The concave portion 42 on the cladding member 40 can ensure that reflected light rays become highly randomized so that they can intersect the core member 20. In addition, the concave portion 42 can maintain the maximum circular periphery of the cladding member 40 while removing the maximum amount off the cladding member 40. Therefore, the cladding member 40 retains a substantially round shape to facilitate splicing to a round pump delivery fiber and, at the same time, has a sufficient amount removed therefrom to improve coupling efficiency.

In another preferred embodiment as shown in FIG. 3(b), the first cladding member 40 has three concave portions 42. These three concave portions 42 are evenly distributed along the exterior circular periphery of the first cladding member 40. The radius of the cladding member 42 is 200 $\mu$m and the radius of the concave portions 42 is 50 $\mu$m. The distance between the core center and the curved boundary of each concave portion 42 is 90 $\mu$m. The result shows a randomization efficiency of 93.7%.

Figure 4A:
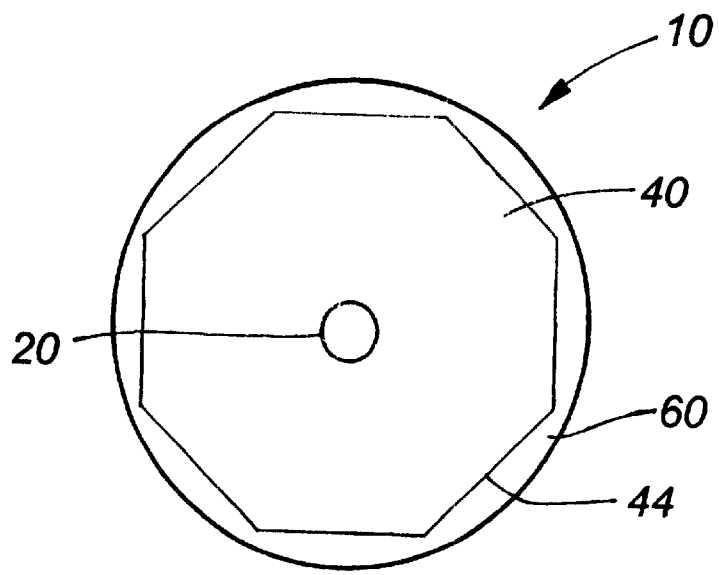
FIGS. 4(a) and 4(b) show double clad fibers with polygonal cladding members according to the second embodiment of the present invention.
Figure 4B:
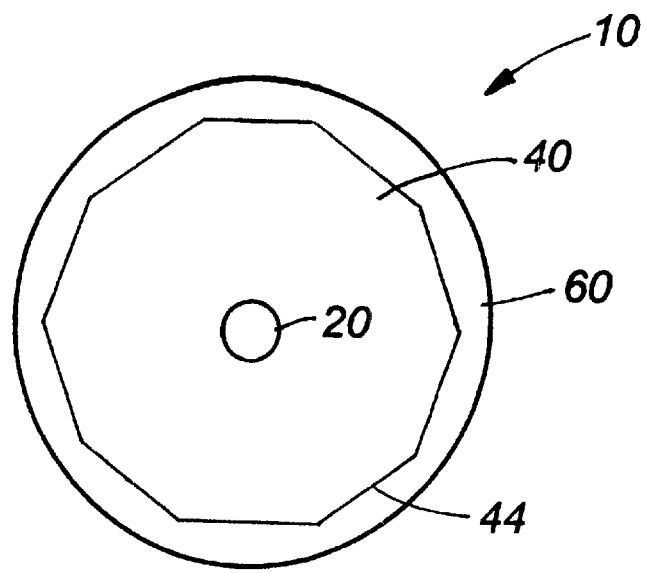

FIGS. 4(a) and 4(b) illustrate a second embodiment of the present invention. In this embodiment, the cladding member 40 has a non-circular shape. Preferably, the cladding member 40 has such a polygon shape that such polygons, when they tile a plane surface, leave spaces between them. In other words, polygons having eight (8) or more sides 44 are used. Such polygon type cladding members 40 are close to a circular shape and therefore are advantageous to splicing.

In various preferred embodiments, cladding members 40 are in the form of eight (8), nine (9), ten (10) and eleven (11) sided polygons 44. In particular, cladding members 40 of nine (9) or ten (10) sided polygons 44 are found to have high randomization efficiency. Therefore, such cladding members 40 are capable of sufficiently scattering light in the cladding member 40 and yielding high clad-to-core energy transfer efficiencies. However, cladding members 40 having a polygon shape of more than twelve (12) sides tend to show reduced energy transfer efficiencies.

FIGS. 5(a) through 5(e) illustrate a third embodiment of the double clad fiber 10 of the present invention. The double clad fiber 10 comprises a center core member 20, a first cladding member 40 surrounding the center core member 20, and a second cladding member 60 surrounding the first cladding member 40. The first cladding member 40 further comprises a region 46 that has a modified refractive index ($n_m$) differing from the rest of the first cladding member 40.

The refractive index $n_m$ of the modified region 46 is preferably less than the refractive index $n_c$ of the first cladding member 40. Alternatively, the refractive index $n_m$ can also be greater than the refractive index $n_c$. When the refractive index $n_m$ of the index modified region 46 is significantly greater than the refractive index $n_c$ of the rest of the cladding member 40, it is preferred to reduce the size of the index modified region 46. A smaller index modified region 46 can minimize the amount of pump light captured in the index modified region 46 so that the energy will not be guided down the length of the fiber without reaching the core member 20.

In a preferred embodiment, the cladding member 40 has a circular shape in which light is scattered to ensure a high clad-to-core energy transfer. Accordingly, skew or helical mode light rays are perturbed by such index modified region 46 introduced in their path. When helical mode light rays encounter the index modified region 46, they are deflected. This scattering effect helps to redistribute the light by coupling the energy into non-helical modes, which effectively transfer energy to the core member 20.

The index modified region 46 can be obtained in different ways. The refractive index can be modified in a localized region by changing the composition in a doped region 47. Moreover, index modifications can be obtained by inducing stresses in the surrounding area of the region 47. In a preferred embodiment where the first cladding member 40 is made of silica glass, the index modified region 46 in the cladding member 40 can be obtained by doping with one or more of the following dopants: Ge, Al, P, B and F.

When sufficient amount of the dopants are used, the coefficient of thermal expansion of the doped region 47 can be made substantially different from that of the surrounding cladding member 40. This difference in coefficient of thermal expansion between the doped and undoped regions 47 and 40 in the cladding member 40 can create a significant stress field portion 48 in the cladding member 40. The stress field portion 48 can be scattered over a region larger than the doped region 47, when the fiber is drawn. This stress can substantially change the refractive index ns in the affected region 48, which in turn helps in mode scattering and redistribution of the light rays.

In a preferred embodiment, the difference between the refractive index of the cladding member 40 and that of the stress field portion 48 ($n_c - n_s$) is within such a range that the stress field portion 48 will not affect the polarization properties of the light traveling in the core member 20. Moreover, the resulting fiber 10 will have an enhanced strength. In another preferred embodiment, the difference between the refractive index of the cladding member and that of the stress field portion ($n_c - n_s$) is less than $10^{-4}$, and more preferably $10^{-5}$.

Figure 5A:
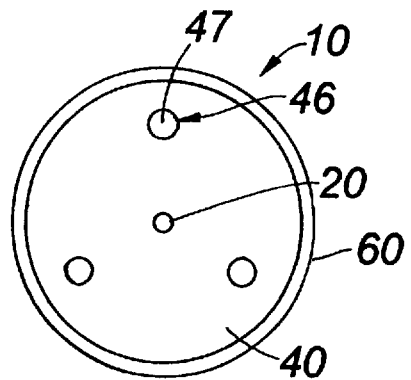
FIGS. 5(a) through 5(e) show double clad fibers with various index modified regions disposed in cladding members according to the third embodiment of the present invention.

FIGS. 5(a) through 5(e) shows various shapes, number and location of index modified regions 46 according to the third embodiment of the present invention. FIG. 5(a) shows a preferred embodiment in which three index modified regions 46 are formed in the first cladding member 40. The index modified regions 46 are evenly distributed along the circular exterior periphery of the cladding member 40. More preferably, the index modified regions 46 are located away from the core member 20 and close to the exterior periphery of the cladding member 40. When so located, the index modified regions 46 can effectively perturb the skew mode light rays present at or near the exterior periphery of the first cladding member 40 and therefore direct all light rays to the core member 20. In addition, the increased distance between the index modified regions 46 and the core member 20 can minimize the effect that the index modified regions 46 have on the polarization properties of the light traveling in the core member. In a preferred embodiment, the resulting randomization efficiency can be as high as 95.8%.

Figure 5B:
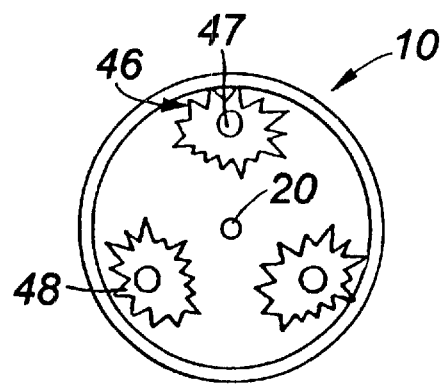

FIG. 5(b) shows the index modified region 46 comprises doped regions 47. The doped regions 47 modify the local refractive index and further induce corresponding stress field portions 48. The shape, number and location of the doped regions 47 can vary similarly to those of the index modified regions 46 as shown in FIG. 5(a) and discussed above.

Figure 5C:
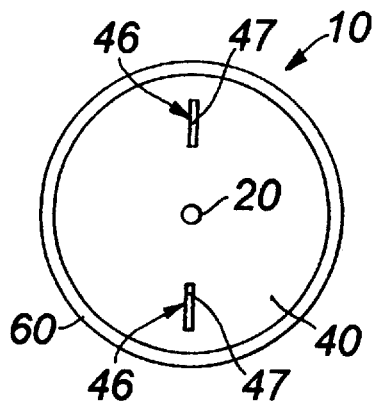
Figure 5D:
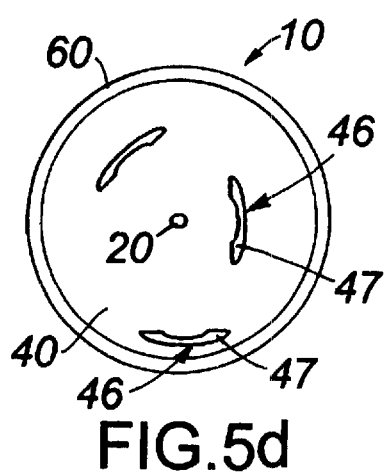
Figure 5E:
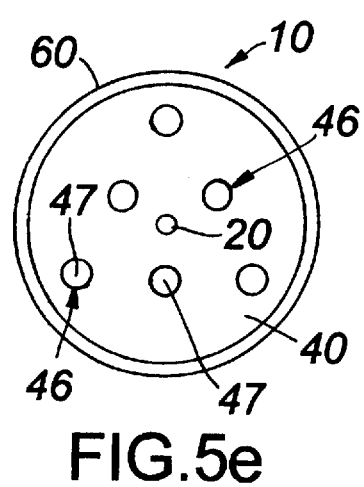

FIGS. 5(c) and 5(d) show index modified regions 46 that have non-circular shapes and, more particularly, rectangular and shell shapes respectively. FIGS. 5(d) and 5(e) show cladding members 40 with index modified regions 46 that ensure maximum perturbation of the skew/helical mode light rays. Preferably, the index modified region/stress inducing members 46 are located away from the core member 20 and close to the exterior periphery of the cladding member 40 as discussed above.

The first cladding members 40 and the optical fibers 10 of the present invention can be used to prepare various double clad fiber lasers and amplifiers. The core, cladding and dopant compositions for making fibers 10 are described below. To fabricate the fiber 10, one composition from each of the groups of core member, first and second cladding members and dopants can be used.

(A) The Core Member

The core member 20 is composed of a transparent medium such as glass doped with one or more 4f-type rare earth element (atomic number 57–71). The rare earth elements are codoped with one or more index modifying elements such as Al, Ge, P, F and B. The following are some examples of core composition based on a silica glass host:

(1) Silica based core member doped with ytterbium, aluminum and phosphorus. The core is about 8 μm (may range from 3–10 μm) in diameter and has a numerical aperture of 0.1 (may range from 0.07 to 0.25).

(2) Silica based core member doped with neodymium, aluminum and phosphorus. The core is about 6.5 μm (may range from 3–10 μm) in diameter and has a numerical aperture of 0.1 (may range from 0.07 to 0.25).

(3) Silica based core member doped with erbium, ytterbium, germanium, aluminum and phosphorus. The core is about 6 μm (may range from 3–10 μm) in diameter and has a numerical aperture of 0.12 (may range from 0.07 to 0.25).

(B) The First Cladding Member

The first cladding member 40 is of substantially pure material, such as transparent medium (glass or polymer). In the case of non-circular cladding member 40, the shape of the cladding member 40 is either a polygon of 8, 9, 10, 11 or 12 sides 44 or a round shape with one or more cut-out portions 42. In the case of a circular type cladding member 40, the composition of the cladding member 40 is non-uniform across the cross-section. More specifically, the cladding member 40 can have an index modified region 46.

(C) The Index Modified Region

The index modified regions 46 can be free air space or doped with one 25 or more dopants. In a preferred embodiment where the cladding member 40 is made of a silica based glass, the dopant can be one or more of the elements of Ge, P, Al, B and F. The following are some examples of silica based compositions that can be used for the doped regions 47 in the cladding member 40:

(1) Air space or vacuum.

(2) Silica doped with Ge and B (or F). Doping levels are such that the index of the doped glass has a refractive index less than or equal to that of pure silica.

(3) Silica doped with Ge and/or P and/or Al. Doping levels are such that the index of the doped glass has a refractive index greater than that of pure silica.

(4) Silica doped with Ge, P and B (or F). Doping levels are such that the index of the doped glass has a refractive index less than or equal to that of pure silica.

Preferably, the dopants are present in silica based glass as oxides, such as $GeO_2$, $P_2O_5$, $B_2O_3$ and $Al_2O_3$. More specifically, the dopants can be selected from one of the following compositions:

(1) $GeO_2$ of the amount ranging from 1 to 3 mole %.
(2) $P_2O_5$ of the amount ranging from 1 to 3 mole %.
(3) $B_2O_3$ of the amount ranging from 1 to 4 mole %.
(4) F of the amount ranging from 0.2 to 1 mole %.
(5) $Al_2O_3$ of the amount ranging from 0.5 to 3 mole %.
(6) $GeO_2$ and F of the amount ranging from 0 to 5 mole % and from 0 to 1 mole % respectively.
(7) $GeO_2$ and $B_2O_3$ of the amount ranging from 0 to 5 mole % and from 0 to 4 mole % respectively.
(8) $P_2O_5$ and F of the amount ranging from 0 to 5 mole % and from 0 to 1 mole % respectively.
(9) $P_2O_5$ and $B_2O_3$ of the amount ranging from 0 to 5 mole % and from 0 to 4 mole % respectively.
(10) $Al_2O_3$ and F of the amount ranging from 0 to 3 mole % and from 0 to 1 mole % respectively.
(11) $Al_2O_3$ and $B_2O_3$ of the amount ranging from 0 to 3 mole % and from 0 to 4 mole % respectively.
(12) $GeO_2$, $P_2O_5$ and F of the amount ranging from 0 to 3 mole %, from 0 to 3 mole % and from 0 to 1 mole % respectively.
(13) $GeO_2$, $P_2O_5$ and $B_2O_3$ of the amount ranging from 0 to 3 mole %, from 0 to 3 mole % and from 0 to 4 mole % respectively.

(D) The Second Cladding Member

The second cladding member 60 is provided to help to guide the pump light in the first cladding member 40. The second cladding member 60 can be made of either a glass or polymer and has a lower refractive index than that of the first cladding member 40. When the second cladding member 60 is made of glass, dopants can be added to the second cladding member 60 to reduce its refractive index so that the doped glass has a lower refractive index than that of the first cladding member 40. In a preferred embodiment, the second cladding member 60 can be a doped glass such as borosilicate glass or fluorinated silica glass. In another preferred embodiment, the second cladding member 60 is made of a low index polymer, more preferably a fluorinated polymer.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An optical fiber suitable for use in fiber lasers and amplifiers, comprising:

a center core member;

a first cladding member surrounding the center core member and arranged for receiving pump light energy to be transferred to the core member, the first cladding member being substantially circular in cross-section and having a predetermined refractive index ($n_c$);

one or more index modified regions formed in the cross section of the first cladding member wherein each index modified region contains one or more dopants selected from a group comprising Ge, Al, P, B and F and is operative to direct light energy to the core member, and a stress field portion with a predetermined refractive index ($n_s$) is formed in an area surrounding each index modified region within the first cladding member; and a second cladding member surrounding the first cladding member;

wherein a difference between the refractive index of the first cladding member and that of the stress field portions ($n_c$-$n_s$) is set within such a range that the stress field portions do not substantially affect polarization properties of light traveling in the core member.

2. The optical fiber of claim 1, wherein the difference between the refractive index of the first cladding member and that of the stress field portions ($n_c$-$n_s$) is less than $10^{-4}$.

3. The optical fiber of claim 1, wherein the difference between the refractive index of the first cladding member and that of the stress field portions ($n_c$-$n_s$) is less than $10^{-5}$.

4. The optical fiber of claim 1, wherein a refractive index of the index modified regions ($n_m$) is less than the refractive index of the first cladding member ($n_c$).

5. The optical fiber of claim 1, wherein a refractive index of the index modified regions ($n_m$) is greater than the refractive index of the first cladding member ($n_c$).

6. The optical fiber of claim 1, including more than one of said index modified regions distributed substantially evenly close to the outer periphery of the first cladding member.

7. The optical fiber of claim 1, wherein the center core member comprises a silica based glass.

8. The optical fiber of claim 7, wherein the center core member is doped with one or more 4f-type rare earth elements.

9. The optical fiber of claim 1, wherein the second cladding member has an index of refraction lower than the index of refraction of the first cladding member ($n_c$).

10. The optical fiber of claim 9, wherein the second cladding member comprises a doped glass.

11. The optical fiber of claim 9, wherein the second cladding member comprises a fluorinated polymer.

* * * * *